US010657302B1

(12) United States Patent
Devyldere et al.

(10) Patent No.: US 10,657,302 B1
(45) Date of Patent: May 19, 2020

(54) ROUTE GENERATION AND BUFFER PLACEMENT FOR DISJOINTED POWER DOMAINS IN AN INTEGRATED CIRCUIT

(71) Applicant: Cadence Design Systems, Inc., San Jose, CA (US)

(72) Inventors: Xavier Devyldere, Cannes (FR); Arnaud Pedenon, Antibes (FR); Francois Silve, Mouans-Sartoux (FR)

(73) Assignee: Cadence Design Systems, Inc., San Jose, CA (US)

( * ) Notice: Subject to any disclaimer, the term of this patent is extended or adjusted under 35 U.S.C. 154(b) by 103 days.

(21) Appl. No.: 15/960,373

(22) Filed: Apr. 23, 2018

Related U.S. Application Data

(63) Continuation of application No. 15/947,590, filed on Apr. 6, 2018, now abandoned.

(51) Int. Cl.
| | | |
|---|---|---|
| *G06F 17/50* | (2006.01) | |
| *G06F 30/30* | (2020.01) | |
| *G06F 30/394* | (2020.01) | |
| *G06F 111/04* | (2020.01) | |
| *G06F 111/20* | (2020.01) | |
| *G06F 119/06* | (2020.01) | |

(52) U.S. Cl.
CPC ............ *G06F 30/30* (2020.01); *G06F 30/394* (2020.01); *G06F 2111/04* (2020.01); *G06F 2111/20* (2020.01); *G06F 2119/06* (2020.01)

(58) Field of Classification Search
USPC ................. 716/101, 102, 104, 105, 106, 114
See application file for complete search history.

(56) References Cited

U.S. PATENT DOCUMENTS

| | | | | |
|---|---|---|---|---|
| 2005/0138589 A1* | 6/2005 | Alpert | ................. | G06F 17/5077 716/114 |
| 2008/0141206 A1* | 6/2008 | He | ........................ | G06F 17/505 716/114 |

OTHER PUBLICATIONS

Bruce Tseng and Hung-Ming Chen, "Blockage and Voltage Island-Aware Dual-VDD Buffered Tree Construction", ISPD '08, Apr. 13-16, 2008, Portland Oregon, USA, 8 pages.

* cited by examiner

*Primary Examiner* — Brian Ngo
(74) *Attorney, Agent, or Firm* — Foley & Lardner LLP (57) ABSTRACT

The present embodiments relate to buffering signals between disjointed power domains with similar power profiles in an integrated circuit. According to some aspects, embodiments relate to a method in which an electronic design automation (EDA) tool displays a schematic including a plurality of first power domains having a first power profile and a plurality of second power domains having a second power profile. The EDA tool generates graph including a plurality of points and a plurality of edges connecting the points, where the points are located on the plurality of second power domains. The EDA tool selects one route from a plurality of routes from a start node on the graph to an end node on the graph and determines a number of buffers located on the route based on associated distance values and a design violation values.

20 Claims, 9 Drawing Sheets

```
Iterate on the sink node NS
Mark NS
Push NS on L
While (L not empty) {
    Node N = pop_front of L
    If (N is not marked) {
        Mark N
        Push predecessor(N) on L
    }
}
```

ROUTE GENERATION AND BUFFER PLACEMENT FOR DISJOINTED POWER DOMAINS IN AN INTEGRATED CIRCUIT

CROSS-REFERENCE TO RELATED APPLICATIONS

The present application is a continuation of U.S. patent application Ser. No. 15/947,590, filed on Apr. 6, 2018, incorporated herein by reference in its entirety.

TECHNICAL FIELD

The present disclosure relates generally to integrated circuits, including but not limited to methods and apparatuses for implementing buffering in multiple power domain integrated circuits.

BACKGROUND

Electronic design automation (EDA) tools are used to design integrated circuits. Integrated circuits can include many thousands and perhaps millions of circuit elements (e.g., transistors, logic gates, diodes) and interconnecting wires and busses. The circuit elements and wires can be formed on many different layers, with various interconnections (e.g., vias) between layers. EDA tools allow a designer to describe an integrated circuit based on its desired behavior on a schematic, and then transform that schematic into a set of geometric shapes called a layout which forms the circuit elements and wires for all the different layers.

SUMMARY

The present embodiments relate to reconfiguration of a schematic. According to some aspects, embodiments relate to a method for generating a circuit. The method can include displaying a schematic of a circuit on a graphical user interface of a computing device. The schematic can include a first power domain configured to receive a first power profile, and a plurality of second power domains configured to receive a second power profile different from the first power profile. The plurality of second power domains can be spatially disjointed. The method can include generating a graph including a plurality of points and a plurality of edges joining the plurality of points. The plurality of points can be located on the plurality of second power domains. At least one point in the plurality of points can be assigned as a start node and at least another point in the plurality of points can be assigned as an end node. The method can include selecting one route from a plurality of routes from the start node to the end node based on a distance value and a design violation value associated with each of the plurality of routes between the start node and the end node. The method can include positioning one or more buffers in at least one of the plurality of second power domains on the selected route. The method can further include placing wires connecting the start node, the one or more buffers, and the end node, along the selected route.

According to some aspects, embodiments relate to a method in which a schematic of a circuit is displayed on a graphical user interface of a computing device. The schematic includes a non-switchable power domain configured to receive a first power level, and a plurality of switchable power domains configured to receive a second power level, the plurality of switchable power domains being disjointed. The method further includes generating a graph including a plurality of points and a plurality of edges joining the plurality of points, the plurality of points located on the plurality of switchable power domains, wherein at least one point in the plurality of points is assigned as a start node and at least another point in the plurality of points is assigned as an end node. The method also includes selecting one route from a plurality of routes from the start node to the end node based on a distance value and a design violation value associated with each of the plurality of routes between the start node and the end node. The method further includes positioning one or more buffers in at least one of the plurality of switchable power domains on the selected route. The method also includes placing wires connecting the start node to the end node including the one or more buffers based on the selected route.

According to some aspects, embodiments relate to a computer readable storage medium having instructions stored thereon which, when executed by a computer, cause the computer to execute a method for implementing a design for an integrated circuit. The method includes, displaying a schematic of a circuit on a graphical user interface of a computing device, the schematic including a first power domain configured to receive a first power profile, and a plurality of second power domains configured to receive a second power profile different from the first power profile, the plurality of second power domains being spatially disjointed. The method further includes generating a graph including a plurality of points and a plurality of edges joining the plurality of points, the plurality of points located on the plurality of second power domains, wherein at least one point in the plurality of points is assigned as a start node and at least another point in the plurality of points is assigned as an end node. The method also includes selecting one route from a plurality of routes from the start node to the end node based on a distance value and a design violation value associated with each of the plurality of routes between the start node and the end node. The method additionally includes positioning one or more buffers in at least one of the plurality of second power domains on the selected route, and placing wires connecting the start node, the one or more buffers, and the end node, along the selected route.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Integrated circuits can be designed to include multiple power domains. A power domain can refer to a portion of the integrated circuit including circuitry and interconnects that have similar or the same power characteristics or power profile, such as supply voltage levels, ground levels, switchability of the power supply, times when the power supplies are switched ON or OFF, compatible cells powered by the same power supply, etc. As an example, different power domains can be defined or implemented to segregate types or groups of cells that are incompatible with one another, such that each power domain is implemented to support or power a respective type or group of cells within which cells are compatible with one another.

As another example, some integrated circuits can include power domains powered by switchable power supplies and include other power domains powered by non-switchable power supplies. Switchable power supplies can be selectively switched ON or OFF to save power. In some instances the power domain powered by switchable power supplies are disjointed. That is, two or more power domains powered by switchable power supplies are separated by power domains powered by non-switchable power supplies. In such instances, signal transmission between two switchable power supply power domains traverses at least a portion of non-switchable power supply power domains. The signal transmission is carried by an interconnect, and in some instances, based on the length or other parameters of the interconnect may need to be buffered to improve a signal quality of the signal transmission. One approach includes adding buffers in the non-switchable power supply power domains. However, this approach renders the buffers non-switchable. Thus, while the switchable power domains between which the signal is transmitted can be switched OFF, the buffers, which are powered by non-switchable power supplies, cannot be switched OFF. Moreover, the buffers formed in the non-switchable power supply power domain may require additional circuitry (and therefore area and power) to adjust the power levels provided by the non-switchable power supply to levels appropriate for the switchable power supply.

While the above discussion and example focuses on switchable power domains and non-switchable power domains, the problems discussed above are similarly applicable to other power domains as well. For example, non-switchable power domains supplied with one voltage level may be separated by power domains with different voltage levels. As another example, switchable power domains that are switched ON or OFF according to one temporal pattern are separated by other switchable power domains that are switched ON or OFF according to a different temporal pattern. These different switchable power domains, in addition to having different temporal ON-OFF switching patterns, can also have different voltage or ground levels. Therefore, transmitting signals between similar and disjoint power domains over other dissimilar power domains may involve including or inserting buffers within the dissimilar power domains. This, as discussed above in relation to the switchable and non-switchable power domains, can undesirably increase area or power consumption of the integrated circuit.

As discussed below, in another approach, the signal transmission between two similar and disjointed power domains can be routed through other disjointed and similar power domains on the integrated circuit. For example, a route can include interconnects connecting a first switchable power domain to a second switchable power domain through one or more intermediate switchable power domains. Buffers can be positioned within the route in the one or more intermediate switchable power domains. In this manner, the buffers, as they are located in switchable power domains, can be switched OFF as well. This can save power during the operation of the integrated circuit. As there can be several routes through the one or more intermediate switchable power domains, selecting a route that provides the lowest distance of delay and the fewest design rule violations can be difficult. The selection is compounded with a large number of intermediate switchable power domains and the number of sinks to which the first switchable power domain is to be routed. The discussion below provides techniques to automatically select a route based on distance and design violations. In particular, the discussion below provides techniques for buffering a signal that starts and ends between two similar and disjoint power domains that are separated by incompatible power domains. The techniques discussed below take advantage of intermediate power domains that have power characteristics that are similar to those of the start and the end power domains. The techniques take into account constraints such as routing length, transition time, capacitance, signal timing, signal integrity and the like in determining the best route.

Figure 1:
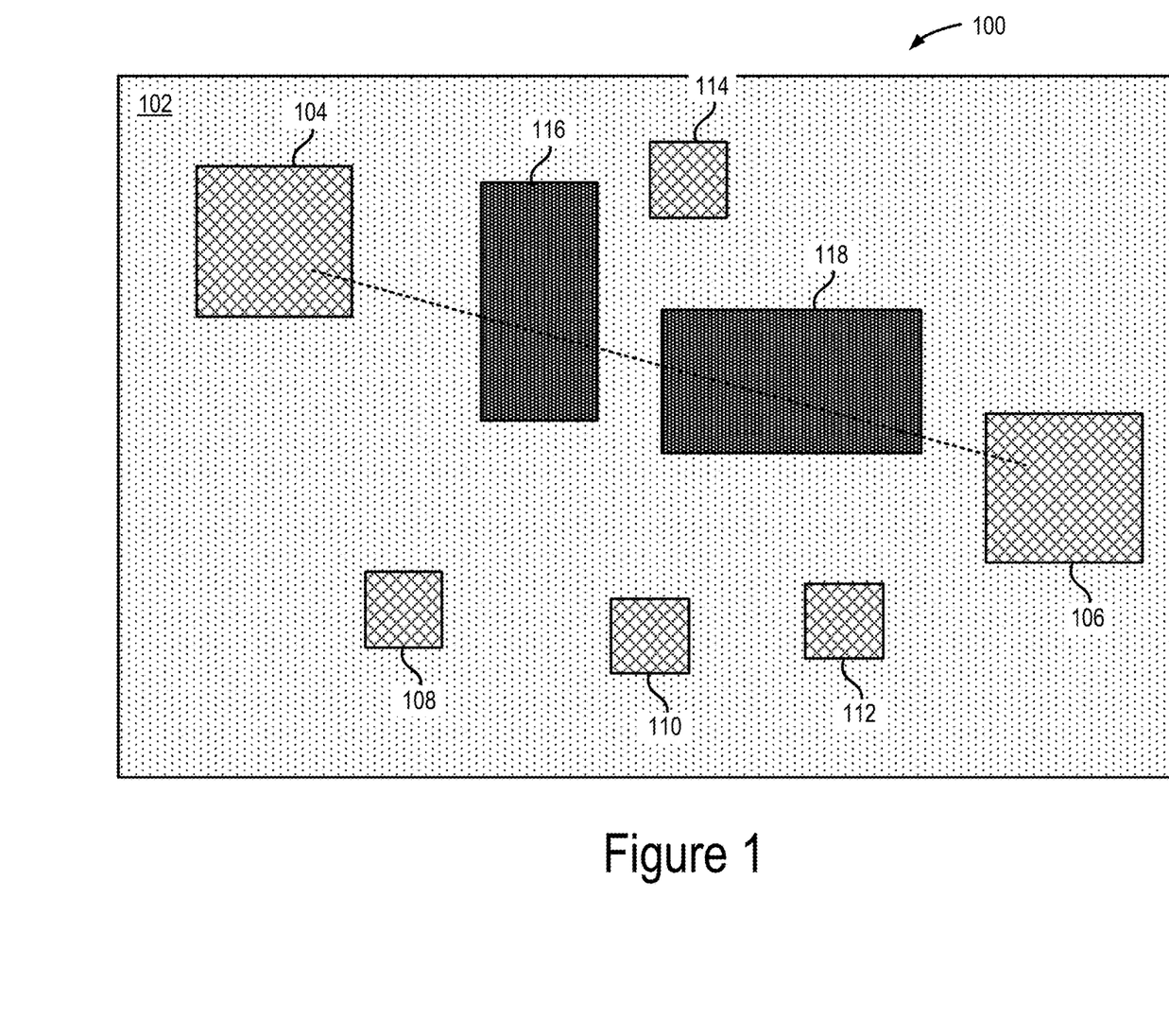
FIG. 1 illustrates a representation of a schematic according to present embodiments.

FIG. 1 illustrates a representation of a schematic 100. An EDA tool can provide a schematic editor on a graphical user interface (GUI), using which a circuit designer can design the schematic 100 of a circuit using circuit objects that represent circuit elements, such as, resistors, capacitors, inductors, transistors, etc. The circuit objects can be selected from a library of circuit objects used by or provided by the EDA tool. The circuit designer can place the selected circuit objects in the schematic in a desired arrangement to design the circuit. The circuit objects also can be interconnected using symbols that represent wires or interconnects. While not shown in FIG. 1, the GUI can include tools and menus that provide user the ability to generate and simulate the circuit represented by the schematic 100. The schematic 100 shows at least a portion of an integrated circuit. The integrated circuit includes several power domains, where a power domain refers to an area on the integrated circuit that is provided with the same power profile or specifications. For example, all circuitry in the same power domain can be provided the same voltage levels. In another example, all circuitry in the same power domain can be provided power from the same power supply. Referring to FIG. 1, and by way of illustration using switchable and non-switchable power domains (although other types of distinct power domains are possible), the integrated circuit includes a non-switchable power domain 102, a first switchable power domain 104, a second switchable power domain 106, a third switchable power domain 108, a fourth switchable power domain 110, a fifth switchable power domain 112, and a sixth switchable power domain 114. The schematic 100 also includes a first macro domain 116 and a second macro domain 118, which can be provided with non-switchable power supplies that are different from the power supply of the non-switchable power domain 102.

The first, second, third, fourth, fifth, and the sixth switchable power domains 104, 106, 108, 110, 112, and 114 (collectively referred to as "switchable power domains") are disjointed. That is, at least two of the switchable power domains are separated by another power domain. In such scenarios, an interconnect connecting one of the switchable power domains to another of the switchable power domains would pass through another power domain. For example, if the first switchable power domain 104 is to be connected to the second switchable power domain 106, the interconnect (or a set of interconnects) would have to pass through the non-switchable power domain 102 and/or the first and the second macro domains 116 and 118. The EDA tool, based on a request by the user via the GUI to connect a node in the first switchable power domain 104 to a node in the second switchable power domain 106, can determine a route through one or more of the third, fourth, fifth, and sixth switchable power domains 108, 110, 112, and 114 (collectively referred to as "intermediate switchable power domains"). In addition, the EDA tool can determine and place buffers in one or more of the intermediate power domains. In one or more embodiments, the switchable power domains can provided with power levels that are different from the power levels provided to the non-switchable power domain 102. For example, the different power levels can include different VDD or GND, different current supply levels, or a combination thereof.

Figure 2:
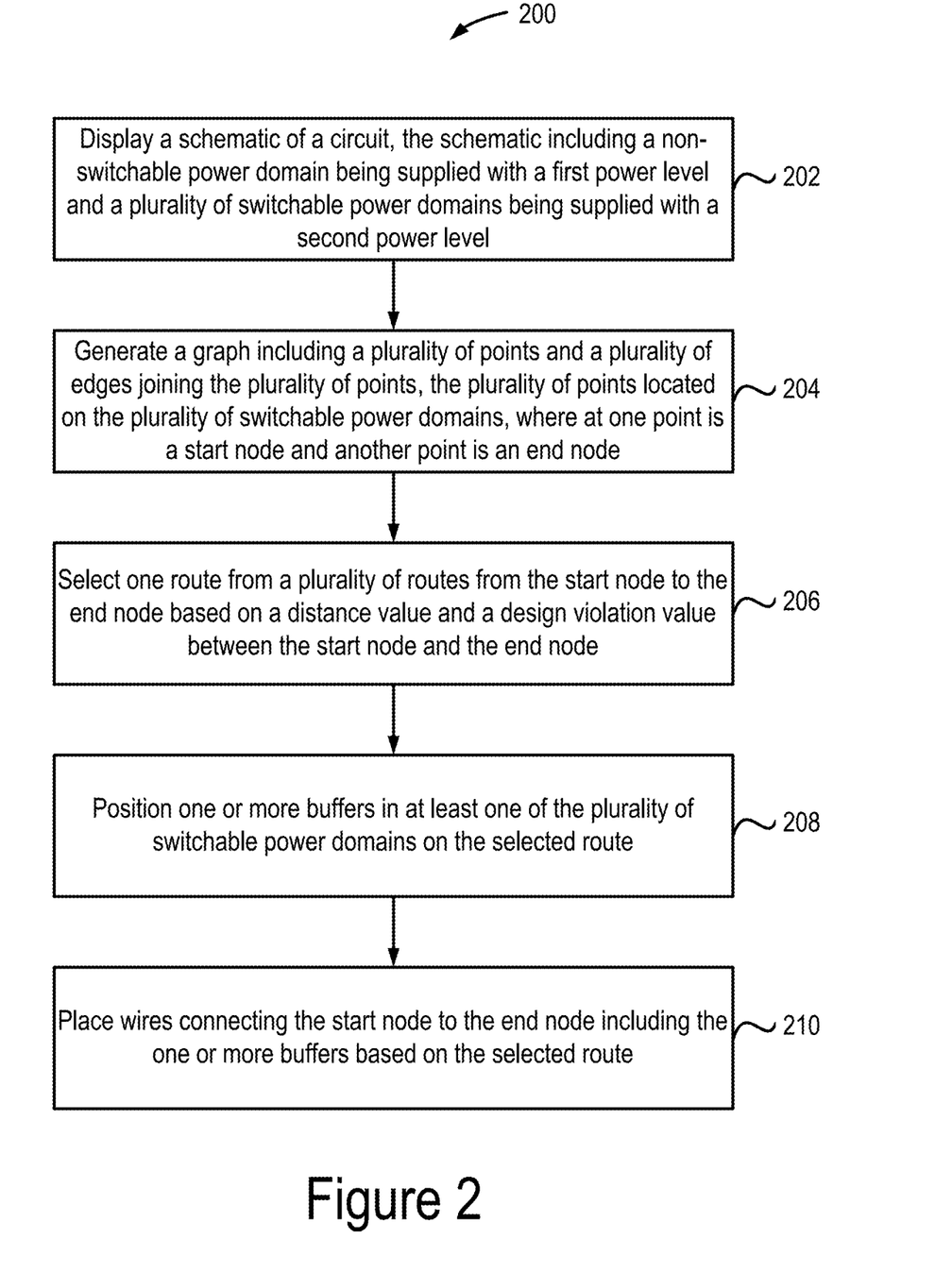
FIG. 2 shows a flow diagram of a process for routing between two disjoint switchable power domains in an integrated circuit, according to the present embodiments.

FIG. 2 shows a flow diagram of a process 200 for routing between two disjoint power domains in an integrated circuit. Using the example of switchable and non-switchable power domains again, the process 200 includes displaying a schematic of a circuit, the schematic including a non-switchable power domain being supplied with a first power level, and a plurality of switchable power domains being supplied with a second power level (202). One example of this process stage is discussed above in relation to FIG. 1, in which the schematic 100 includes a non-switchable power domain 102 and a six switchable power domains 104, 106, 108, 110, 112, and 114. The non-switchable power domain 102 is provided with a first power level from a power supply that is not switchable. That is the power supply cannot be switched OFF. The first power level can include a voltage level, a current level, or a combination thereof. On the other hand, the six switchable power domains 104, 106, 108, 110, 112, and 114 are provided a second power level from a power supply that is switchable. That is the power supply can be switched ON or OFF. The second power level can include a voltage level, a current level, or a combination thereof. The first power level can be different from the second power level, or can be the same as the second power level.

Figure 3:
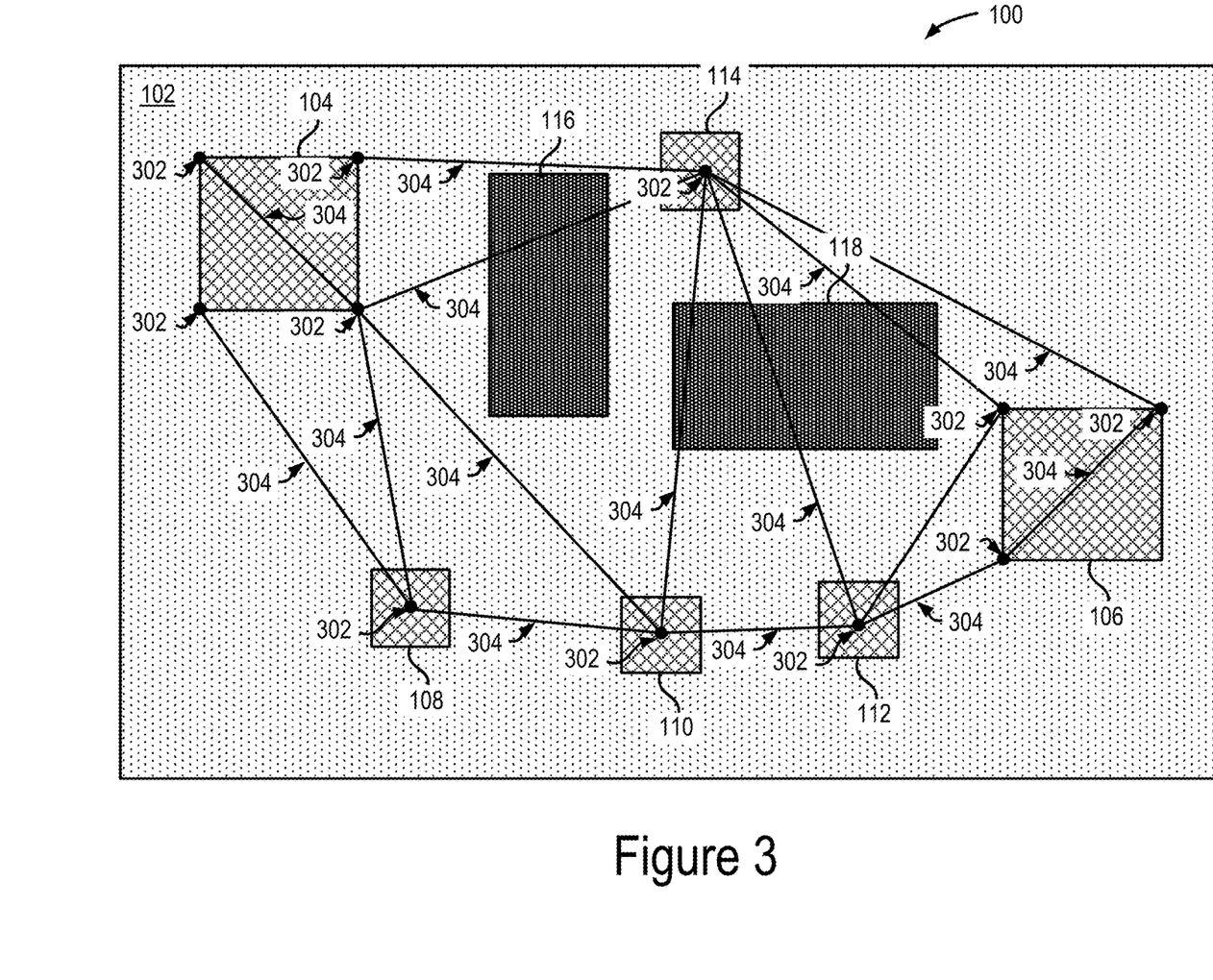
FIG. 3 illustrates a graph on the schematic 100 shown in FIG. 1.

The process 200 also includes generating a graph including a plurality of points and a plurality of edges joining the plurality of points, the plurality of points located on the plurality of switchable power domains, where at least one point is a start node and another point is an end node (204). FIG. 3 illustrates a graph 300 on the schematic 100 shown in FIG. 1. The graph 300 can be generated by the EDA tool. The graph 300 includes a plurality of points 302 and a plurality of edges 304 connecting the plurality of points 302. Each switchable power domain can include one or more points based on its size. For example, the first switchable power domain 104 and the second switchable power domain 106 each includes four points 302, while each of the intermediate switchable power domains, which are relatively smaller in size, include only one point. The number of edges 304 from each point can be limited to a max value to reduce the complexity of the graph 300. For example, the EDA tool can limit the number of edges 304 connected to a point 302 to about seven or about ten. In some embodiments, the EDA tool can utilize Delaunay triangulation algorithm to generate the edges 304 between the plurality of points 302. Each edge 304 can have an associated distance or length, which can represent the length of an interconnect that would be needed to implement that edge 304 on the integrated circuit.

In one or more embodiments, the EDA tool can avoid or not include edges that are longer than a distance threshold. For example, the EDA tool or a user can select a distance threshold value that can correspond to a length of an interconnect over which the signal transmission may be degraded beyond an acceptable value. Long interconnects can have high capacitance, which can result in the degradation of the signal carried by the interconnect. In some instances, the degree of degradation may be high enough that the signal may be unrecoverable even if the interconnect is terminated at a buffer. The EDA tool, or the user, can set such a length as the distance threshold. In such instances, the EDA tool can discard edges on the graph that are longer than the distance threshold. In one or more embodiments, the EDA tool can discard an edge 304 if the associated delay caused by the interconnect implementing the edge is greater than a delay threshold value. This can be particularly useful where interconnects of the same length can have different delays because the metal layer in which the interconnects are formed. Thus an interconnect formed on a first metal layer can have a greater delay than an interconnect, of the same length, formed on a second metal layer. In such instances, the EDA tool can determine the delay that would be caused by an interconnect, formed in the associated metal layer, that is used to implement the edge 304, and discard the edge 304 from the graph if the delay is greater than the delay threshold.

Figure 4:
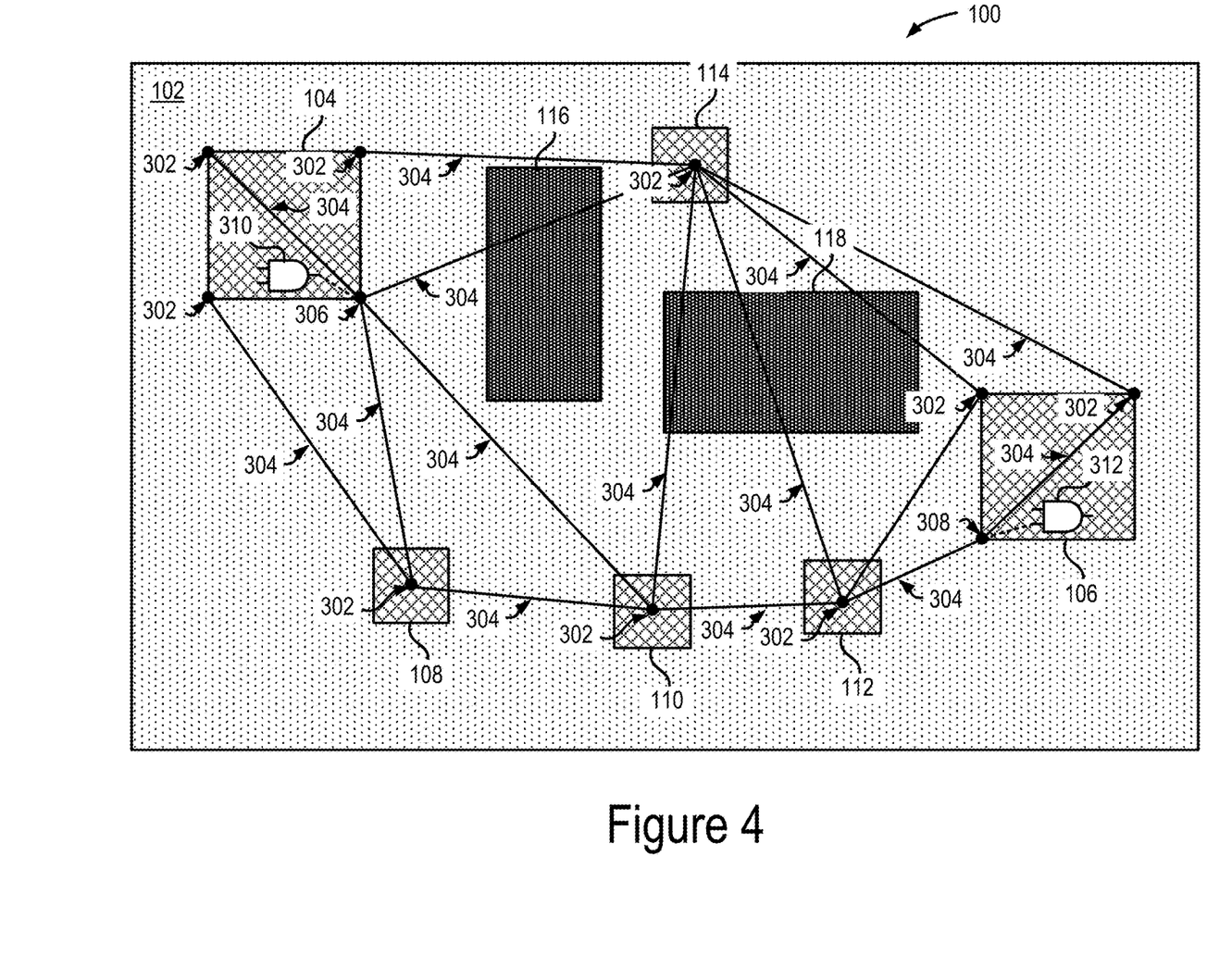
FIG. 4 illustrates a graph including a start node and an end node, according to the present embodiments.

In one or more embodiments, the EDA tool can select one point in the first switchable power domain 104 that is closest to the location of a circuit that generates the output signal that is to be transmitted to the second switchable power domain 106. FIG. 4 illustrates the graph 300 including a start or source node 306 and an end or sink node 308. The EDA tool selects start node 306 as it is a point, within the first switchable power domain 104, nearest to the output circuit 310. Similarly, the EDA tool selects the end node 308 as it is a point, within the second switchable power domain 106, nearest to the input circuit 312. In one or more embodiments, the EDA tool can modify the graph 300 to remove one or more edges that are not traversable from both the start node 306 and the end node 308.

The process 200 also includes selecting one route from a plurality of routes identified between the start node and the end node based on a distance value and a design violation value (206). The EDA tool identifies a plurality of routes from the start node to the end node that traverse through one or more intermediate switchable power domains (108, 110, 112, and 114). The EDA tool, for each of the plurality of routes, can determine a distance value and a design violation value. The distance value can represent the path length of the route, while the design violation value can represent a numerical representation of the number or extent of design rule violations caused by the particular route. In one or more embodiments, the distance value for a route can be determined based on a cumulative path length of edges of the graph 300 on the route. In one or more embodiments, the portion of a route (or wire) corresponding to each edge (e.g., between two nodes of the graph 300) can have one or more associated characteristics such as a capacitance value (C), resistance value (R), RC constant, signal transition time, slew rate, fan out, number of attached nodes, signal integrity, spacing from another route (or wire), voltage drop, signal transmission delay/time, etc. In one or more embodiments, the cumulative values for these characteristics for the edges within a particular route can be used to determine design violation values for that route. In one or more embodiments, design constraints may be defined for the integrated circuit, where the design constraints can include minimum or maximum allowable values for the above mentioned characteristics for the edges. The design violation values for the route can be determined based on the extent by which the cumulative values of the characteristics for the edges in the route are over or below the maximum or minimum values of the design constraints.

Figure 5:
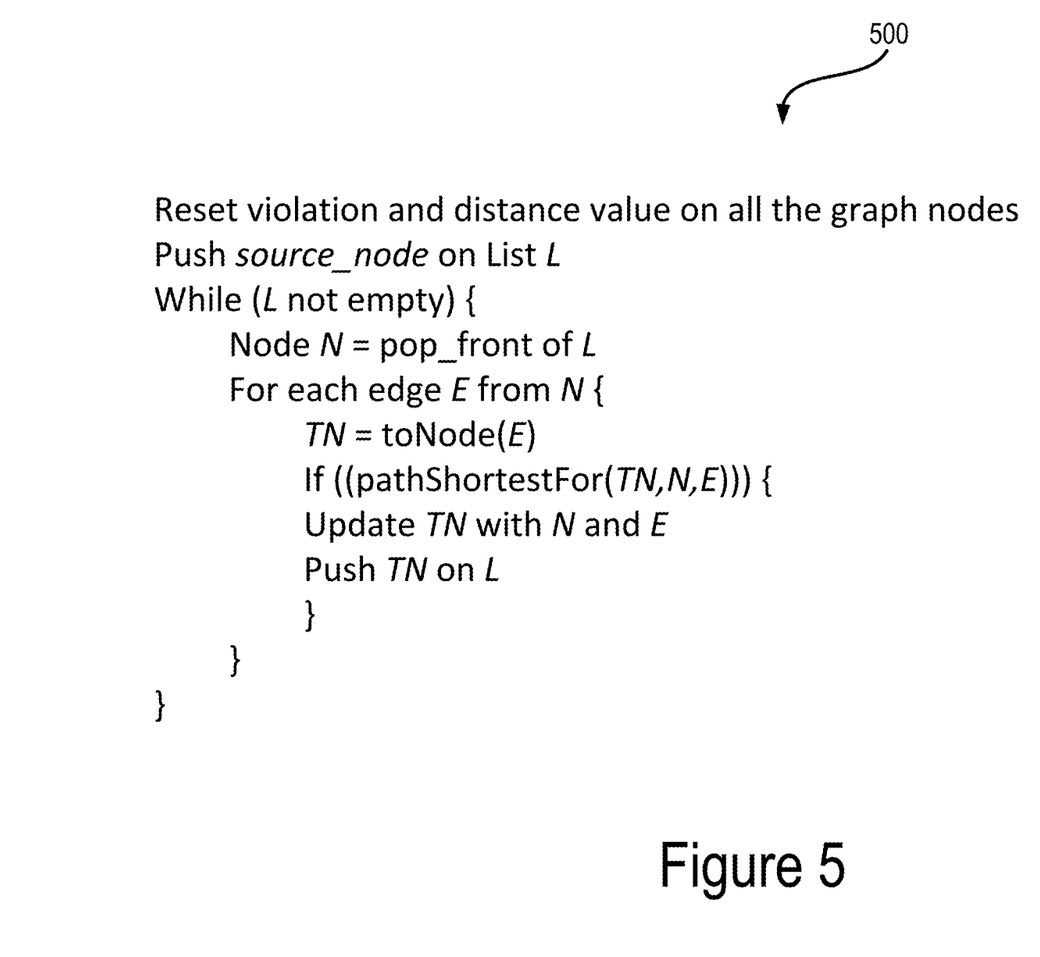
FIG. 5 illustrates a pseudocode that can be utilized for determining a shortest distance of any point on the graph shown in FIG. 4, according to the present embodiments.

In one or more embodiments, the EDA tool can determine a shortest distance from each point on the graph 300 to the source node 306. The EDA tool can then trace back the route from the sink node 308 to the source node 306 over the shortest distance. FIG. 5 illustrates a pseudocode 500 that can be utilized for determining a best path from a source node to any point on the graph shown in FIG. 4. In particular, the pseudocode 500 determines a distance value and a design violation value associated with a path between the source node 306 and each of a set of points on the graph 300. For example, for each of a set of points in the graph 300, the pseudocode 500 determines which of the several edges E connected to the point results in a best path to the source node 306. The function "pathShortestFor" evaluates whether the selected path from the point to the source node via the selected edge E is an improvement over paths via other edges. The improvement is determined based on a combination of the distance value and the design violation value. In this manner, the pseudocode 500 determines the best path from any point or node on the graph 300 to the source node 306. It is understood that the pseudocode 500 shown in FIG. 5 is only an example, and that similar functionality can be implemented using a different code.

Figure 6:
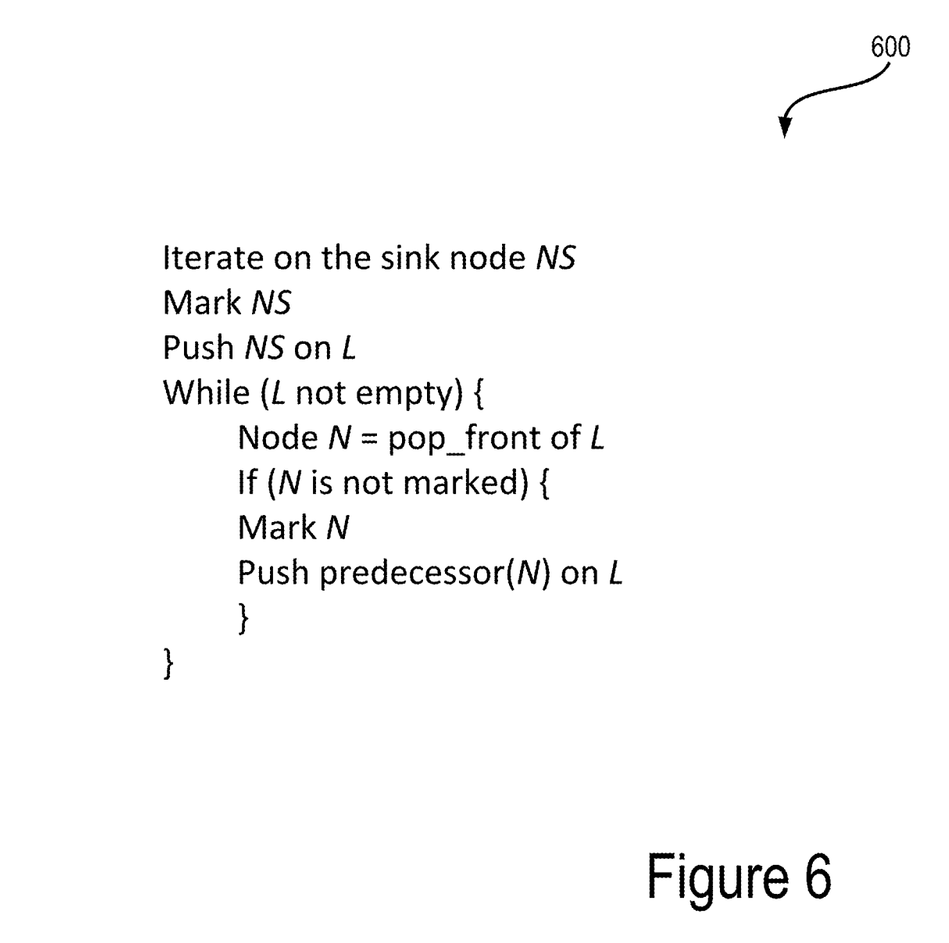
FIG. 6 illustrates a pseudocode for determining a shortest path between a sink node and a source node in the graph shown in FIG. 4, according to the present embodiments.

FIG. 6 illustrates a pseudocode 600 for determining a best path between the sink node 308 and the source node 306. In particular, the pseudocode 600 selects a sink node 308 and traces back the best path through the graph 300 through each point back to the source node 306 based on the best paths determined by the pseudocode 500 shown in FIG. 5. The pseudocode 600 marks nodes to avoid duplicates.

Figure 7:
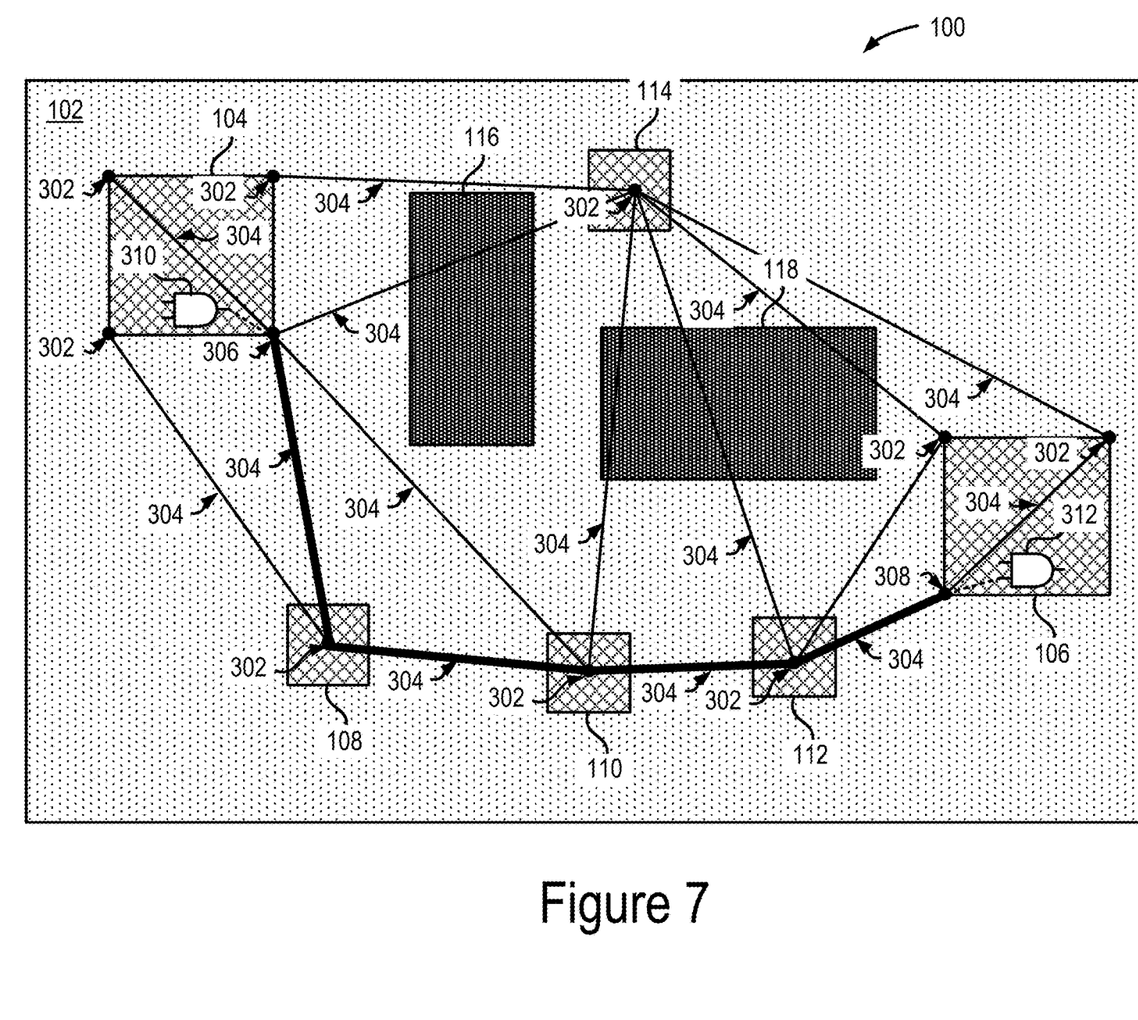
FIG. 7 illustrates the schematic including a selected route from the start node to the end node according to the present embodiments.

The EDA tool can select one route from the plurality of routes based on a combination of the distance value and the design violation value. For example, the EDA tool can generate a weighted average of the distance value and the design violation value for each identified route, and select the route that results in the smallest weighted average value. Of course, alternate approaches for determining the combination of the distance value and the design violation value can be used. FIG. 7 illustrates the schematic 100 including a selected route from the start node 306 to the end node 308. The selected route is highlighted with bold lines. The EDA tool, based on the selection criteria discussed above, selects a route that traverses the third, fourth, and the fifth switchable power domain 108, 110, and 112.

Figure 8:
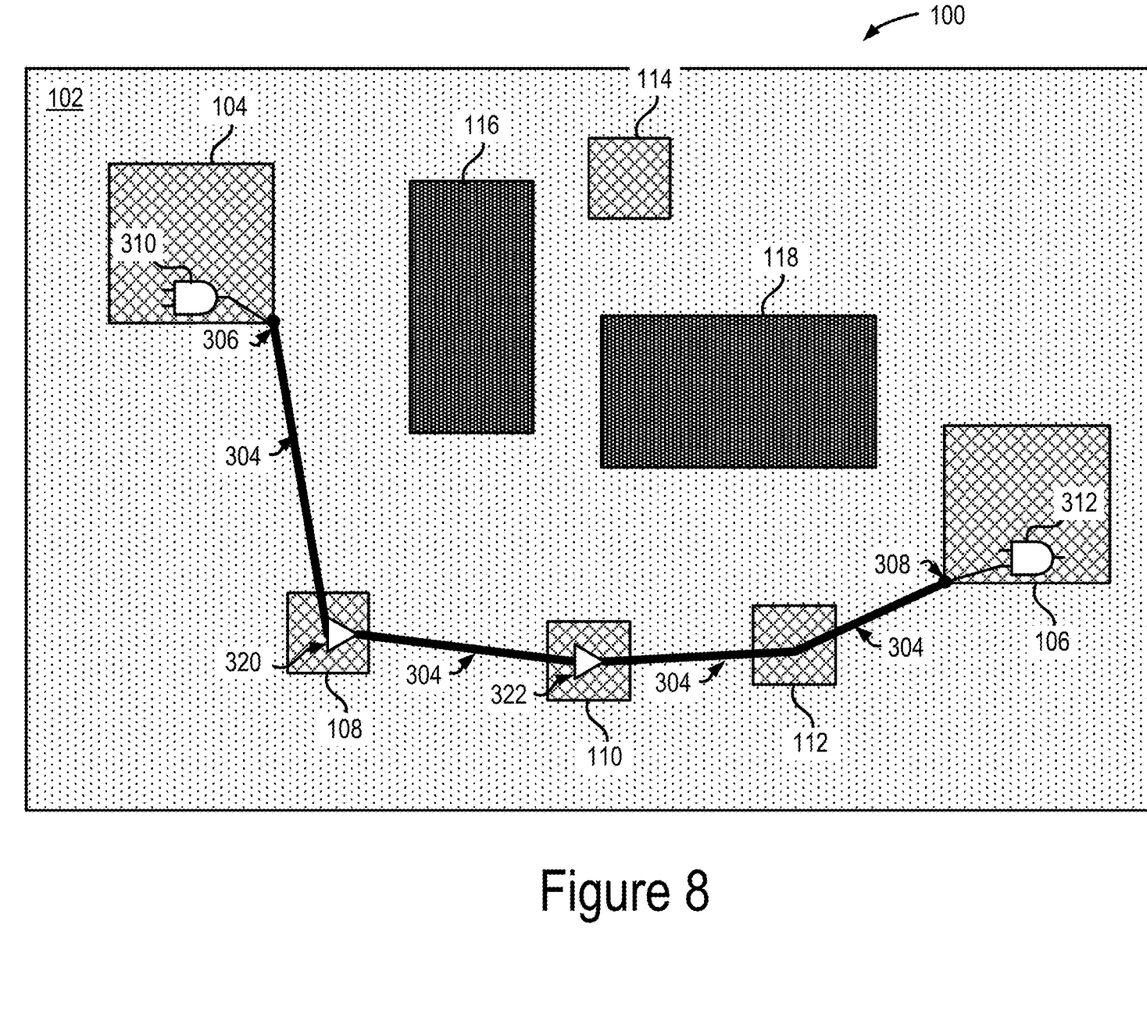
FIG. 8 illustrates the schematic including the selected route and buffers positioned on the selected route, according to the present embodiment.

The process 200 further includes positioning one or more buffers in at least one of the plurality of switchable power domains on the selected route (208). In some instances, due to factors such as the length of the selected route, the metal layers used to implement the selected route, the power supply levels, noise margins, etc., the EDA tool can position buffers along the selected route to boost the signal carried on the route. For example, FIG. 8 illustrates the schematic 100 including the selected route and buffers positioned on the selected route. The EDA tool can use one or more techniques to determine an optimal number and positions of the buffers along the selected route. For example, the EDA tool can use techniques such as rule based, Van Ginneken, or other techniques to determine the number and the positions of the buffers. One example of ruled based technique includes starting from the sink node 308 and counting specified target distance between the sink node 308 and inserted buffers, and inserting buffers if the target distance is above a specified value. FIG. 7 illustrates one example where the EDA tool determines that the route includes two buffers 320 and 322 positioned in the third switchable power domain 108 and the fourth switchable power domain 110, respectively. The number and the positions of the buffers can vary based on the particular implementation of the circuit shown in the schematic 100. In one or more embodiments, the EDA tool also can determine the position and the number of buffers based on factors such as speed or delay of signal through the route, a total routing length, cumulative area of the buffers, and other timing or physical properties.

The process 200 may also include performing a design verification check on the selected route. In particular, some design violations can be determined only on the complete route as opposed to portions of the selected route. In particular, the EDA tool can determine any design violations based on information of the complete implementation of the selected route on the integrated circuit. Implementation information can include the metal layers used to implement one or more portions of the selected route, the total length of the interconnects, the resistance, capacitance, and inductance associated with the selected route, etc. This information can be compared with acceptable values defined by the design rules, and any violations can be determined. If the EDA tool determines violations in the selected route, the EDA tool can discard the selected route, and identify the next best route as the selected route.

The process 200 also includes placing wires connecting the start node to the end node including the one or more buffers based on the selected route (210). The EDA tool can automatically place wires on the schematic 100 connecting the output circuit 310 to the start node 306, connecting the start node 306 to the first buffer 320, connecting the first buffer 320 to the second buffer 322, connecting the second buffer to the third switchable power domain 112, connecting the third switchable power domain 112 to the end node 308, and connecting the end node 308 to the input circuit 312. In some embodiments, the EDA tool displays the resulting circuit, including the wires, to the user on the GUI as an output to a user's request to determine a route form the first switchable power domain 104 to the second switchable power domain 106.

While the discussion above focused on techniques to determine the best routes between two switchable power domains separated by non-switchable power domains through other switchable power domains, it is understood that similar techniques can be applied to routing signals from any two disjoint power domains (e.g., switchable or non-switchable) that have similar power characteristics or profiles that are separated by incompatible power domains through intermediate power domains that have power characteristics or profiles similar to those of the start and the end power domains.

Figure 9:
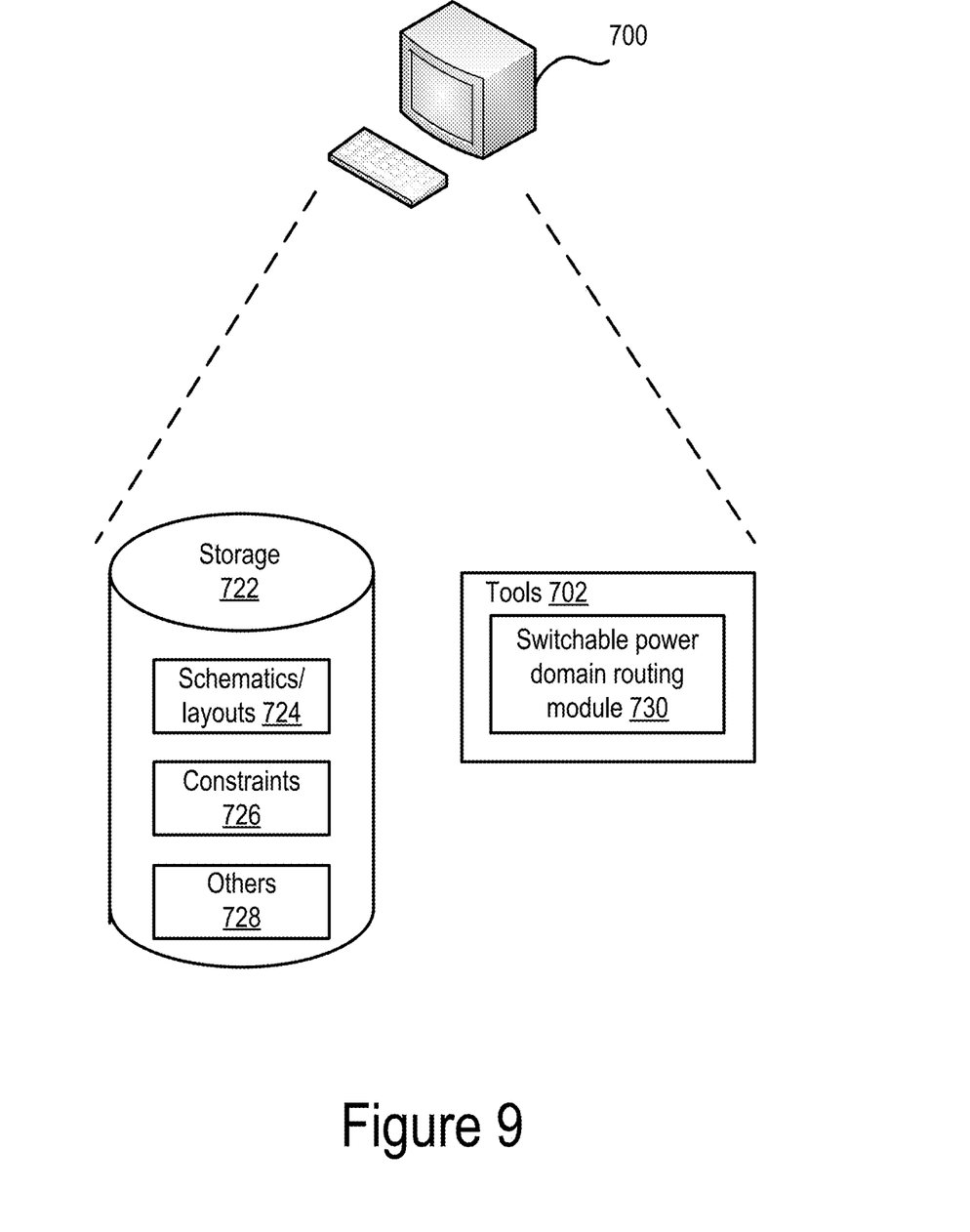
FIG. 9 is a functional block diagram illustrating an example system according to the present embodiments.

FIG. 9 is a functional block diagram of an example system for using switchable power domain routing in an integrated circuit design according to the present embodiments. In some embodiments, the system 700 can be one or more computers that are loaded with software (e.g., EDA tools) and/or customized to include hardware for interactively and/or automatically implementing designs of integrated circuits (e.g., ASICs, SOCs, full custom digital ICs). In some embodiments, the one or more computing systems 700 comprise various components not shown such as processor (s) or processor core(s), memory, disks, etc. The software and/or custom hardware may include interactive or automated modules such as a placer, a routing engine, a layout editor, a wire editor, a design rule checker, a verification engine, a module generator, and/or a floor-planner, as will be appreciated by those skilled in the art.

In one or more embodiments, the computing system 700 may further write to and read from a local or remote volatile or non-volatile computer accessible storage 722 that stores thereon data or information such as, but not limited to, one or more databases such as post-placement layouts, schematic design database(s) or physical design database(s) 724 (e.g., GDS II or OASIS data, etc.), libraries, rule decks, constraints (e.g., track specifications, minimum spacing, pitch/width requirements, widths, BCB rules), etc. 726, and/or other information or data 728 (e.g., trim shape locations) that may be required to support the methodology of the present embodiments. According to certain aspects, design rules in storage 726 are extendable or changeable (e.g., via APIs and the like) without changing other components or data in system 700.

In some embodiments, the one or more computing systems are implemented in a "cloud" configuration and/or a client/server configuration. For example, one or more server computers may be loaded with application software (e.g., a router and/or other EDA tool) for implementing some or all of the methodology of the present embodiments, and one or more client computers can communicate with the server computer(s) via a network to perform some or all of the methodology of the embodiments for a particular design.

In some embodiments, the one or more computing systems 700 may, by various standalone software, hardware modules or combinations thereof 702 (e.g., EDA tool), include a switchable power domain routing module 730 that generates routes between disjoint power domains in an integrated circuit. The switchable power domain routing module 730 can execute the process 200 discussed above in relation to FIG. 2. The switchable power domain routing module 730 may be implemented by adapting or communicating with certain pre-existing modules (e.g., placer, router, layout editor, design rule checker) as may be required to implement a methodology to implement design rule correct IC designs according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for generating a circuit, comprising:
displaying a schematic of a circuit on a graphical user interface of a computing device, the schematic comprising:
a non-switchable power domain, and
a plurality of switchable power domains;
generating a graph including a plurality of points and a plurality of edges joining the plurality of points, the plurality of points located on the plurality of switchable power domains, wherein at least one point in the plurality of points is assigned as a start node and at least another point in the plurality of points is assigned as an end node;
selecting one route from a plurality of routes from the start node to the end node based on a distance value and a design violation value associated with each of the plurality of routes between the start node and the end node;
positioning one or more buffers in at least one of the plurality of switchable power domains on the selected route; and
placing wires connecting the start node, the one or more buffers, and the end node, according to the selected route.

2. The method of claim 1, wherein the non-switchable power domain is configured to receive a power level that is different from that of the plurality of switchable power domains.

3. The method of claim 1, wherein the plurality of switchable power domains are separated by at least the non-switchable power domain.

4. The method of claim 1, further comprising generating the graph such that at least two points of the plurality of points are positioned in a single switchable power domain from the plurality of switchable power domains.

5. The method of claim 1, further comprising determining the distance value associated with each of the plurality of routes based on a signal propagation delay associated with each edge in the route.

6. The method of claim 1, further comprising determining the design violation value associated with each of the plurality of routes based on design rules.

7. The method of claim 1, wherein selecting one route from the plurality of routes includes selecting a route that has a smallest value representing a combination of the respective distance value and the design violation value.

8. The method of claim 1, wherein selecting one route from the plurality of routes includes selecting a route that has a smallest distance value and a design violation value that indicates an absence of design violation.

9. A method for generating a circuit, comprising:
displaying a schematic of a circuit on a graphical user interface of a computing device, the schematic comprising:
a first power domain configured to receive a first power profile, and
a plurality of second power domains configured to receive a second power profile different from the first power profile, the plurality of second power domains being spatially disjointed;
generating a graph including a plurality of points and a plurality of edges joining the plurality of points, the plurality of points located on the plurality of second power domains, wherein at least one point in the plurality of points is assigned as a start node and at least another point in the plurality of points is assigned as an end node;
selecting one route from a plurality of routes from the start node to the end node based on a distance value and a design violation value associated with each of the plurality of routes between the start node and the end node;
positioning one or more buffers in at least one of the plurality of second power domains on the selected route; and
placing wires connecting the start node, the one or more buffers, and the end node, along the selected route.

10. The method of claim 9, wherein the first power level is different from the second power level.

11. The method of claim 9, wherein the plurality of second power domains are separated by at least the first power domain.

12. The method of claim 9, further comprising generating the graph such that at least two points of the plurality of points are positioned in a single second power domain from the plurality of second power domains.

13. The method of claim 9, further comprising determining the distance value associated with each of the plurality of routes based on a signal propagation delay associated with each edge in the route.

14. The method of claim 9, further comprising determining the design violation value associated with each of the plurality of routes based on design rules.

15. The method of claim 9, wherein selecting one route from the plurality of routes includes selecting a route that has a smallest value representing a combination of the respective distance value and the design violation value.

16. The method of claim 9, wherein selecting one route from the plurality of routes includes selecting a route that has a smallest distance value and a design violation value that indicates an absence of design violation.

17. The method of claim 9, further comprising displaying the schematic of the circuit on the graphical user interface of the computing device, the schematic comprising the plurality of second power domains configured to receive a the second power level from a switchable power supply.

18. A computer readable storage medium having instructions stored thereon which, when executed by a computer, cause the computer to execute a method for implementing a design for an integrated circuit, the method comprising:
displaying a schematic of a circuit on a graphical user interface of a computing device, the schematic comprising:
a first power domain configured to receive a first power profile, and
a plurality of second power domains configured to receive a second power profile different from the first power profile, the plurality of second power domains being spatially disjointed;
generating a graph including a plurality of points and a plurality of edges joining the plurality of points, the plurality of points located on the plurality of second power domains, wherein at least one point in the plurality of points is assigned as a start node and at least another point in the plurality of points is assigned as an end node;
selecting one route from a plurality of routes from the start node to the end node based on a distance value and a design violation value associated with each of the plurality of routes between the start node and the end node;
positioning one or more buffers in at least one of the plurality of second power domains on the selected route; and
placing wires connecting the start node, the one or more buffers, and the end node, along the selected route.

19. The computer readable storage medium of claim 18, wherein the first power level is different from the second power level.

20. The computer readable storage medium of claim 18, wherein the plurality of second power domains are separated by at least the first power domain.

\* \* \* \* \*